US012681036B2

(12) United States Patent
Isebrand et al.

(10) Patent No.: US 12,681,036 B2
(45) Date of Patent: Jul. 14, 2026

(54) BULKHEAD FOR AIR DATA PROBE

(71) Applicant: Rosemount Aerospace Inc., Burnsville, MN (US)

(72) Inventors: Scott Isebrand, Minneapolis, MN (US); Paul R. Johnson, Prior Lake, MN (US); Greg A. Seidel, Lakeville, MN (US); Timothy Golly, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 319 days.

(21) Appl. No.: 18/394,090

(22) Filed: Dec. 22, 2023

(65) Prior Publication Data

US 2025/0208161 A1    Jun. 26, 2025

(51) Int. Cl.
*G01P 5/165*        (2006.01)
*B64D 43/02*        (2006.01)

(52) U.S. Cl.
CPC .............. *G01P 5/165* (2013.01); *B64D 43/02* (2013.01)

(58) Field of Classification Search
CPC ........ G01P 5/165; G01P 13/025; B64D 43/02
See application file for complete search history.

(56) References Cited

U.S. PATENT DOCUMENTS

| 2,984,107 A | 5/1961 | Strieby et al. |
| 9,856,027 B2 | 1/2018 | Anderson et al. |
| 10,126,320 B2 * | 11/2018 | Anderson ............... G01P 5/165 |
| 10,589,870 B2 | 3/2020 | Golly et al. |
| 2016/0266164 A1 * | 9/2016 | Ellison .................. G01P 13/025 |
| 2019/0186974 A1 * | 6/2019 | Golly .................... G01P 13/025 |
| 2019/0202576 A1 * | 7/2019 | Golly .................... B64D 43/02 |
| 2019/0227094 A1 * | 7/2019 | Golly ........................ G01F 1/46 |
| 2020/0141964 A1 * | 5/2020 | Marty .................... B64D 43/02 |
| 2022/0120780 A1 * | 4/2022 | Anderson ............. B64D 43/02 |

FOREIGN PATENT DOCUMENTS

| EP | 4478054 A1 * | 12/2024 | ........... G01P 13/025 |

OTHER PUBLICATIONS

Extended European Search Report dated May 9, 2025, for corresponding European Patent Application No. 24221936.8-1001, 10 pgs.

* cited by examiner

*Primary Examiner* — Thomas M Hammond, III

(74) *Attorney, Agent, or Firm* — Kinney & Lange, P.A.

(57)        ABSTRACT

A bulkhead for an air data probe includes an upstream end, a downstream end, and an upstream portion extending from the upstream end. The upstream portion includes an exterior surface, a first plurality of walls extending radially outward from the exterior surface of the upstream portion, a first pad extending radially outward from the exterior surface of the upstream portion, and a first plurality of channels formed between one or more of the first plurality of walls and the first pad. The first plurality of channels are configured to receive a wire heater.

14 Claims, 10 Drawing Sheets

BULKHEAD FOR AIR DATA PROBE

BACKGROUND

The present disclosure relates generally to air data probes, and in particular, to bulkheads for air data probes.

Air data probes are installed on aircraft to measure air data parameters. Air data parameters may include barometric static pressure, altitude, air speed, angle of attack, angle of sideslip, temperature, total air temperature, relative humidity, and/or any other parameter of interest. Examples of air data probes include pitot probes, total air temperature probes, or angle of attack sensors.

Air data probes are mounted to an exterior of an aircraft in order to gain exposure to external airflow. Thus, air data probes are exposed to the environmental conditions exterior to the aircraft, which can include cold temperatures and/or moisture. During atmospheric moisture conditions, it is possible for air data probes to have pressure sensing measurement errors or spikes due to moisture being present within chambers and conduits of the air data probe.

SUMMARY

A bulkhead for an air data probe includes an upstream end, a downstream end, and an upstream portion extending from the upstream end. The upstream portion includes an exterior surface, a first plurality of walls extending radially outward from the exterior surface of the upstream portion, a first pad extending radially outward from the exterior surface of the upstream portion, and a first plurality of channels formed between one or more of the first plurality of walls and the first pad. The first plurality of channels are configured to receive a wire heater.

An air data probe includes a probe head, a wire heater extending through the probe head, and a bulkhead positioned in the probe head. The wire heater is wrapped around the bulkhead. The bulkhead further includes an upstream end, a downstream end, an upstream portion extending from the upstream end and having a first outer diameter, a middle portion extending from the upstream portion and having a second outer diameter, and a downstream portion extending from the middle portion to the downstream end. The second outer diameter of the middle portion is smaller than the first outer diameter of the upstream portion. The bulkhead further includes a passthrough extending from the upstream end to the downstream end through the upstream portion, the middle portion, and the downstream portion. The air data probe further includes an air gap formed between the probe head and the middle portion of the bulkhead.

DETAILED DESCRIPTION

In general, the present disclosure describes a bulkhead for a probe head of an air data probe that is shaped to allow more wire heater to be in contact with the bulkhead in areas surrounding angle of attack (AOA) ports. Extra wire heater around AOA ports allows for more heating to keep moisture from entering the AOA ports and traveling through the probe head. If moisture does enter the probe head, the additional heating allows for the moisture to be evaporated off near the bulkhead. The bulkhead is also shaped to create an air gap between the wire heater and an interior surface of the probe head to additionally prevent heat loss, thus increasing surface temperatures near the AOA ports.

Figure 1:
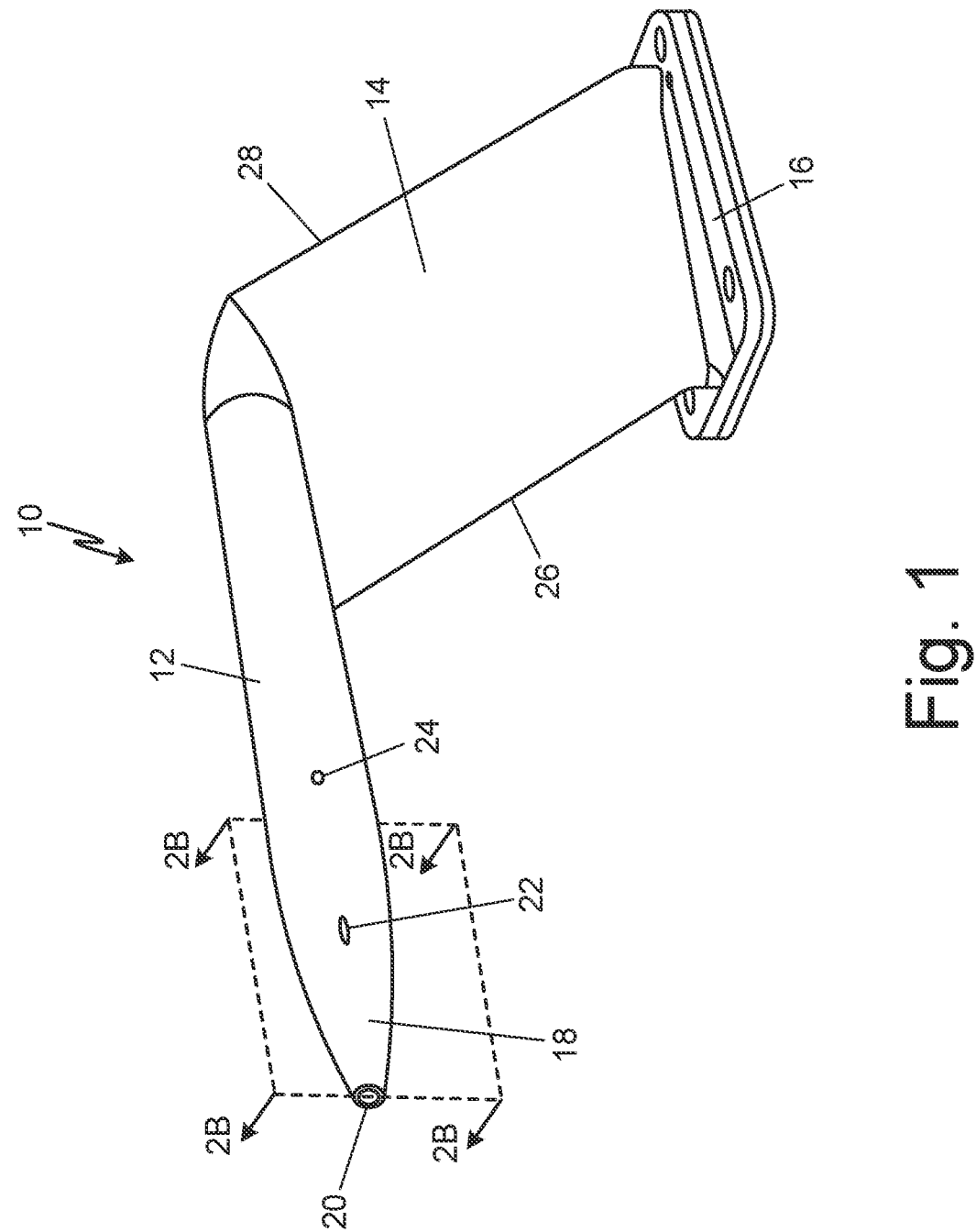
FIG. 1 is an isometric view of an air data probe.

FIG. 1 is an isometric view of air data probe 10. Air data probe 10 includes probe head 12, strut 14, and mounting flange 16. Probe head 12 includes tip 18, pitot opening 20, angle of attack (AOA) ports 22, and static ports 24. Strut 14 includes leading edge 26 and trailing edge 28.

Air data probe 10 is formed by probe head 12, strut 14, and mounting flange 16. Air data probe 10 may be a pitot-static probe or any other suitable air data probe. Probe head 12 is a sensing head of air data probe 10. Probe head 12 faces an upstream direction. Probe head 12 is an elongate portion of air data probe 10. Internal components of air data probe 10 are located within probe head 12. An aft end of probe head 12 is connected to a first end of strut 14. Strut 14 is blade-shaped. Internal components of air data probe 10 are located within strut 14. Strut 14 is adjacent mounting flange 16. A second end of strut 14 is connected to mounting flange 16. Mounting flange 16 makes up a mount for air data probe 10. Mounting flange 16 is connectable to an aircraft.

Probe head 12 has tip 18 at a forward, or upstream, portion of probe head 12. At a forward end of tip 18 is pitot opening 20. Probe head 12 has two AOA ports 22. A first AOA port 22 extends through a first side of probe head 12, and a second AOA port 22 extends through a second side of probe head 12 opposite of the first side. AOA ports 22 are openings that extend into probe head 12 that are configured to allow pneumatic communication through probe head 12. Probe head 12 has two static ports 24. A first static port 24 is at the first side of probe head 12 extending through the first side, and a second static port 24 is at the second side of probe head 12 extending through the second side of probe head 12 opposite of the first side. Static ports 24 are openings that extend into probe head 12 that are configured to allow pneumatic communication through probe head 12. In alternate embodiments, probe head 12 can have any number of AOA ports 22 or static ports 24. AOA ports 22 are upstream of static ports 24. Strut 14 has leading edge 26 at a forward, or upstream, side of strut 14 and trailing edge 28 at an aft, or downstream, side of strut 14. Leading edge 26 is disposed opposite trailing edge 28. Probe head 12 extends from leading edge 26 of strut 14.

Air data probe 10 is configured to be installed on an aircraft. Air data probe 10 may be mounted to a fuselage of the aircraft via mounting flange 16 and fasteners, such as screws or bolts. Strut 14 holds probe head 12 away from the fuselage of the aircraft to expose probe head 12 to external airflow. Probe head 12 takes in air, at pitot opening 20, AOA ports 22, and static ports 26, from surrounding external airflow and communicates air pressures pneumatically through internal components and passages of probe head 12 and strut 14. Each of air pressures entering separate passages within probe head 12 can travel through internal components within probe head 12 to internal components within strut 14 through mounting flange 16 into the aircraft. Pressure measurements are communicated to a flight computer and can be used to generate air data parameters related to the aircraft flight condition.

AOA ports 22 can lie in a plane in which angle of attack is measured and face generally opposite directions (for example, up and down). Each of AOA ports 22 can take in air and a difference in pressure between the two ports can be used to indicate an angle of attack. AOA ports 22 intake air that is cold and can contain moisture, which can lead to issues with sensing accurate pressure measurements. Increased heating around AOA ports 22 can prevent moisture from entering pneumatic lines to allow for accurate pressure sensing measurements.

Figure 2A:
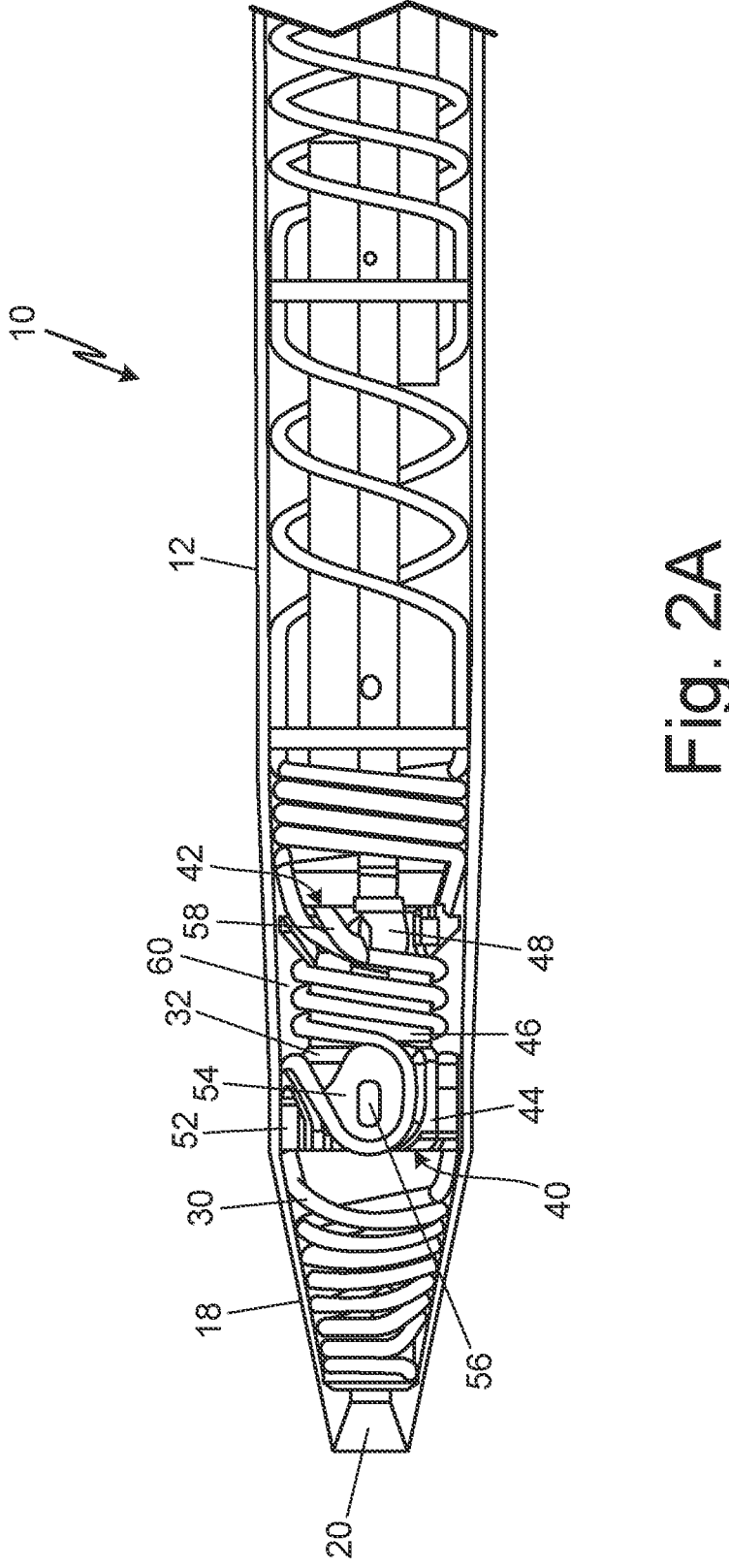
FIG. 2A is a side view of a probe head of the air data probe showing a bulkhead disposed within the probe head.
Figure 2B:
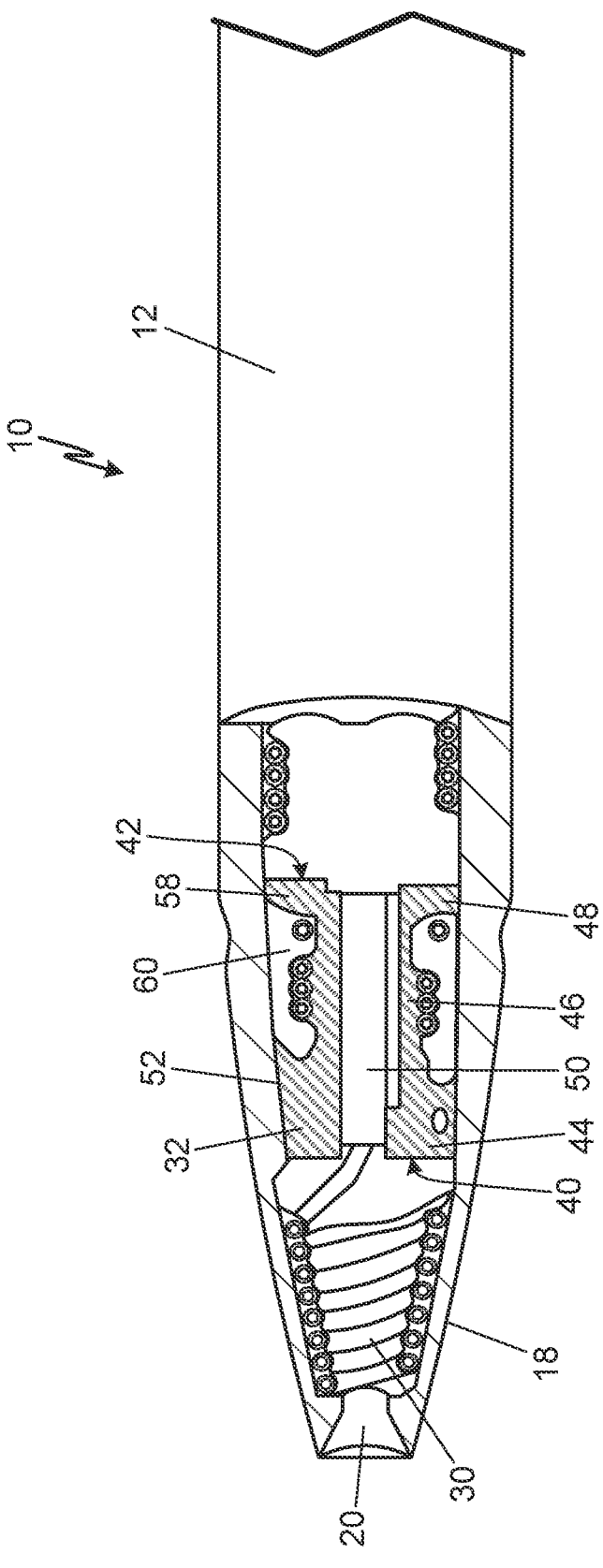
FIG. 2B is a partial cross-sectional view of the probe head taken along plane 2B of FIG. 1.

FIG. 2A is a side view of probe head 12 of air data probe 10 showing bulkhead 32 disposed within probe head 12. FIG. 2B is a partial cross-sectional view of probe head 12 taken along plane 2B of FIG. 1. FIGS. 2A-2B will be discussed together. In FIG. 2A, probe head 12 is transparent to show components internal to probe head 12. Air data probe 10 includes probe head 12, which includes tip 18 and pitot opening 20. Air data probe 10 further includes wire heater 30 and bulkhead 32. Bulkhead 32 includes upstream end 40, downstream end 42, upstream portion 44, middle portion 46, downstream portion 48, passthrough 50 (shown in FIG. 2B), first plurality of walls 52, pads 54 (shown in FIG. 2A), AOA openings 56 (shown in FIG. 2A), and second plurality of walls 58. Air data probe 10 further includes air gap 60.

Air data probe 10 is configured to measure ambient air at different locations in order to calculate angle of attack among other air data parameters for flight of an aircraft. Air data probe 10 includes probe head 12 having tip 18 at an upstream end of probe head 12. Tip 18 may have a conical shape. Pitot opening 20 is formed in the upstream end of tip 18 of probe head 12. Pitot opening 20 is configured to receive ambient air that flows through probe head 12. Probe head 12 can be made from various materials, to house components within probe head 12. Probe head 12 and bulkhead 32 can be manufactured using an additive manufacturing process.

Air data probe 10 further includes wire heater 30 positioned in probe head 12. Wire heater extends from an upstream end to a downstream end of probe head 12. Wire heater 30 is electrically coupled to a power supply in the aircraft to receive power for heating. Wire heater 30 is a single wire in the embodiment shown in FIGS. 2A-2B. In alternate embodiments, wire heater 30 can be two wires or three or more wires.

Bulkhead 32 is positioned in probe head 12 downstream of tip 18. Bulkhead 32 includes upstream end 40 and downstream end 42 opposite of upstream end 40. Bulkhead 32 includes upstream portion 44, middle portion 46, and downstream portion 48. Upstream portion 44 is positioned near tip 18 of probe head 12. Upstream portion 44 extends axially away from upstream end 40 of bulkhead 32. Middle portion 46 is connected to upstream portion 44 and extends axially away from upstream portion 44. Downstream portion 48 is connected to middle portion 46 and extends axially away from middle portion 46. Upstream portion 44 has a first outer diameter that is greater than a second outer diameter of middle portion 46. Downstream portion 48 has a third outer diameter that is generally equal to a second outer diameter of middle portion 46. The second outer diameter of middle portion 46 is smaller than the first outer diameter of upstream portion 44.

Passthrough 50 is a channel that extends through bulkhead 32. Passthrough 50 extends from upstream end 40 to downstream end 42 of bulkhead 32. Air that enters probe head 12 through pitot opening 20 in tip 18 can flow through passthrough 50 of bulkhead 32 as it flows from the upstream end to the downstream end of probe head 12.

Bulkhead 32 further includes first plurality of walls 52 extending radially outward from an exterior surface of upstream portion 44 of bulkhead 32. Pads 54 extend radially outward from the exterior surface of upstream portion 44 of bulkhead 32. Pads 54 are positioned on opposite sides of bulkhead 32. First plurality of walls 52 are positioned between and adjacent to pads 54. AOA openings 56 extend through pads 54. AOA openings 56 are aligned with AOA ports 22 (shown in FIG. 1). Bulkhead 32 further includes second plurality of walls 58 extending radially outward from an exterior surface of downstream portion 48.

Wire heater 30 is wrapped around first plurality of walls 52 and pads 54 on upstream portion 44 of bulkhead 32. This allows wire heater 30 to be positioned adjacent to AOA ports 22 (shown in FIG. 1). Wire heater 30 is wrapped in a spiral pattern around middle portion 46 of bulkhead 32. Wire heater 30 is wrapped around second plurality of walls 58 on downstream portion 48 of bulkhead 32.

Air data probe 10 further includes air gap 60 formed between probe head 12 and middle portion 46 of bulkhead 32. More specifically, air gap 60 is formed between an interior surface of probe head 12, and middle portion 46 and wire heater 30 wrapped around middle portion 46 of bulkhead 32. Middle portion 46 of bulkhead 32 has an outer diameter that is smaller than an outer diameter of upstream portion 44. This allows air gap 60 to be formed radially outward from middle portion 46. Wire heater 30 does not contact an interior surface of probe head 12 in the area radially outward from middle portion 46. Air gap 60 allows heat to be retained radially outward from middle portion of bulkhead 32. Air gap 60 creates an insulation barrier of air between probe head 12 and wire heater 30 to reduce heat loss from bulkhead 32 at middle portion 46.

Air data probe 10 is mounted to an aircraft. During flight, air surrounding the aircraft will impart fluid pressures on air data probe 10 at openings on probe head 12, including pitot opening 20, AOA ports 22 (shown in FIG. 1), and static ports 24 (shown in FIG. 1). Computations can be made with these pressure measurements providing parameters of the aircraft flight, such as angle of attack.

The aircraft may travel through precipitation, clouds, extreme cold, etc. In varying circumstances, probe head 12 disposed on the aircraft will encounter precipitation or moisture that may enter pitot opening 20, AOA ports 22, or static ports 24, which can cause pressure paths within probe head 12 to become clogged with moisture leading to air data probe 10 providing inaccurate readings of air characteristics surrounding probe head 12. Wire heater 30 functions to provide heat near openings on probe head 12 to keep moisture from entering openings and/or to allow moisture to be evaporated off within probe head 12.

In the present example, wire heater 30 interfaces with bulkhead 32 to increase an amount of heating surrounding AOA ports 22. Wire heater 30 is wrapped around first plurality of walls 52 and pads 54 on upstream portion 44 of bulkhead 32 to increase the amount of heating near AOA ports 22. Wrapping wire heater 30 around upstream portion 46 of bulkhead 32 allows for additional wire heater 30 to be positioned closer to AOA ports 22, localizing the heat around AOA ports 22 to increase heating near AOA ports 22. Further, increased heating allows for improved accuracy in air data measurements for improved accuracy in parameters used during flight of the aircraft.

Figure 3A:
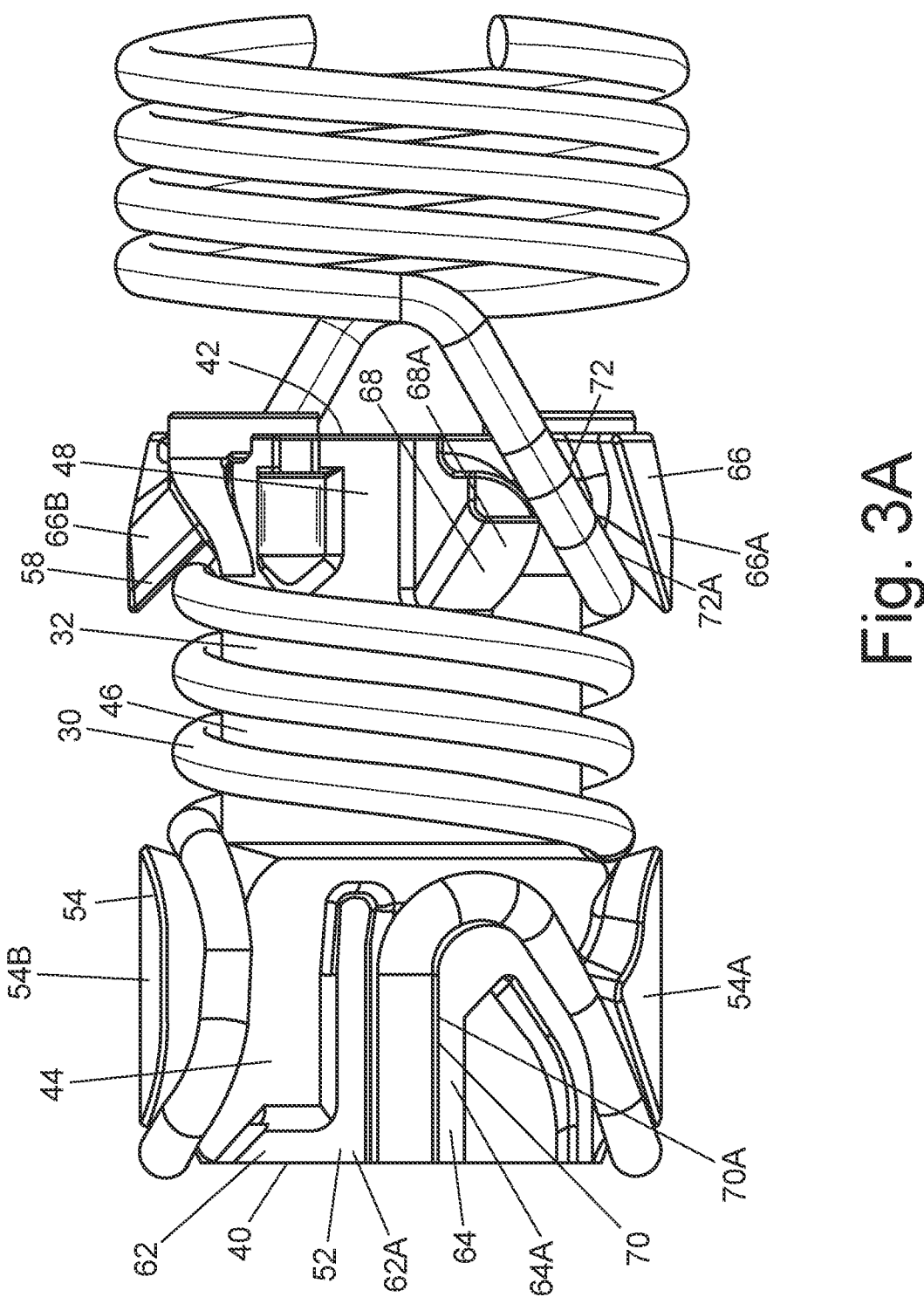
FIG. 3A is a top view of the bulkhead showing a wire heater wrapped around the bulkhead.
Figure 3B:
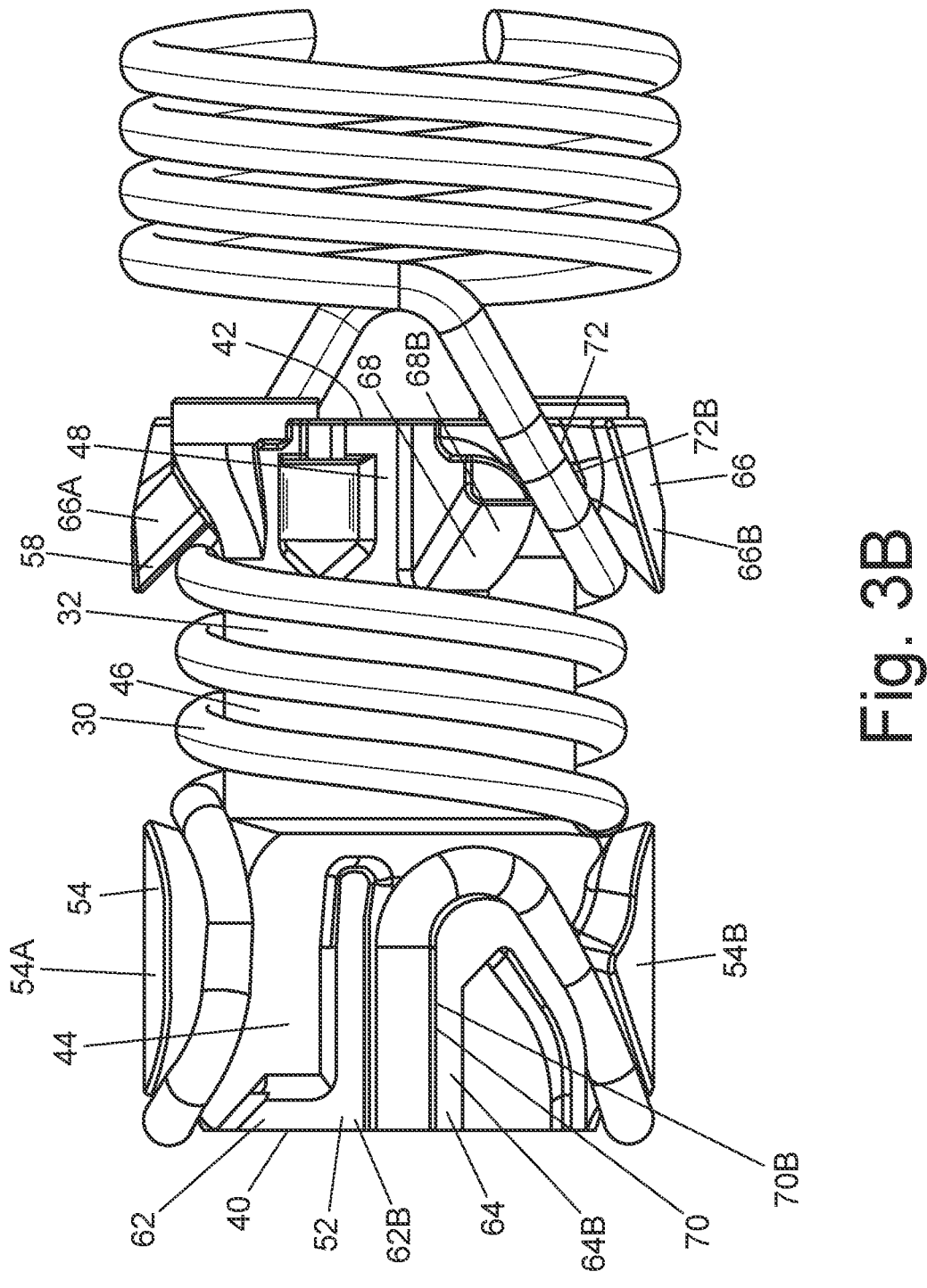
FIG. 3B is a bottom view of the bulkhead showing the wire heater wrapped around the bulkhead.
Figure 3C:
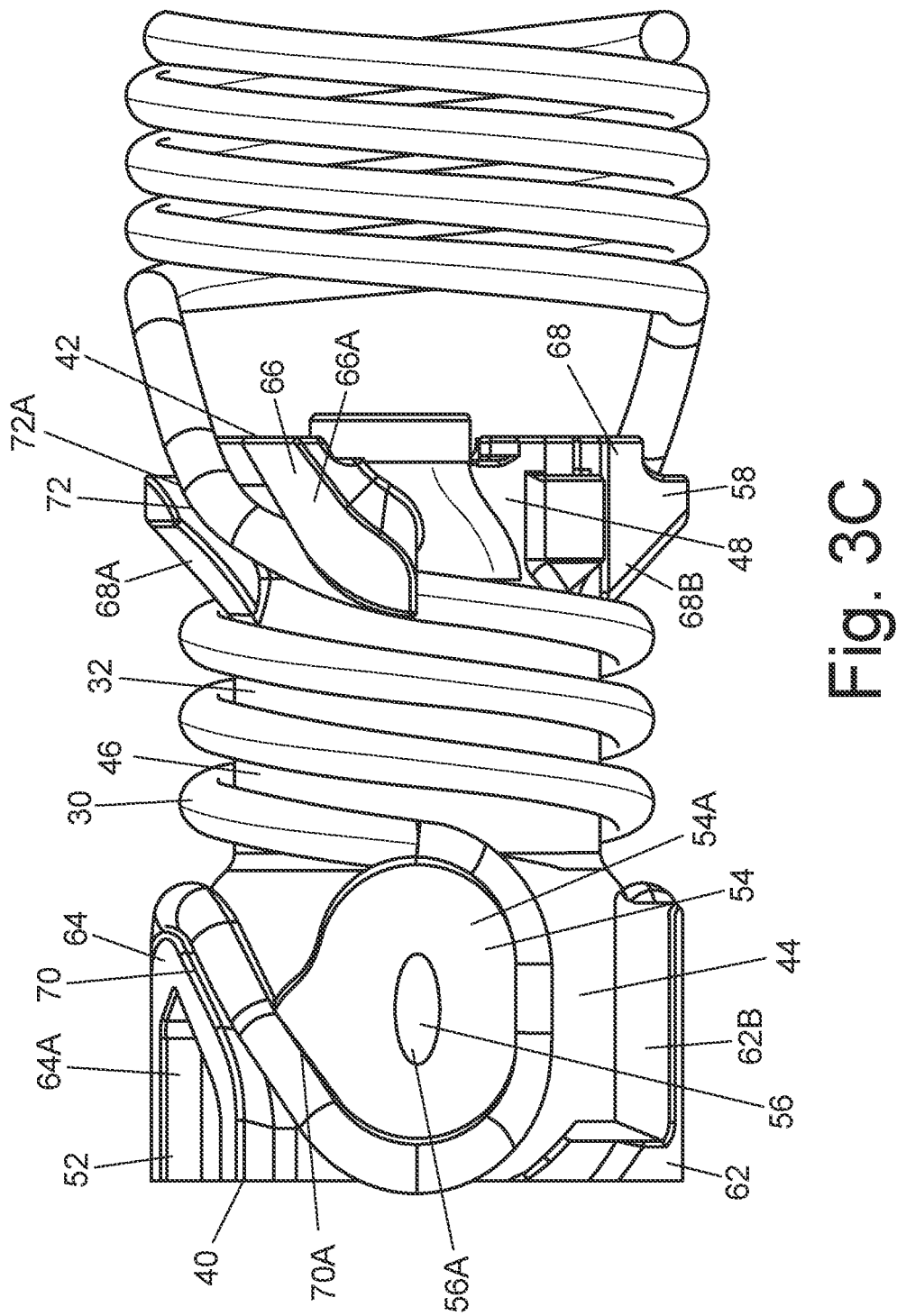
FIG. 3C is a first side view of the bulkhead showing the wire heater wrapped around the bulkhead.
Figure 3D:
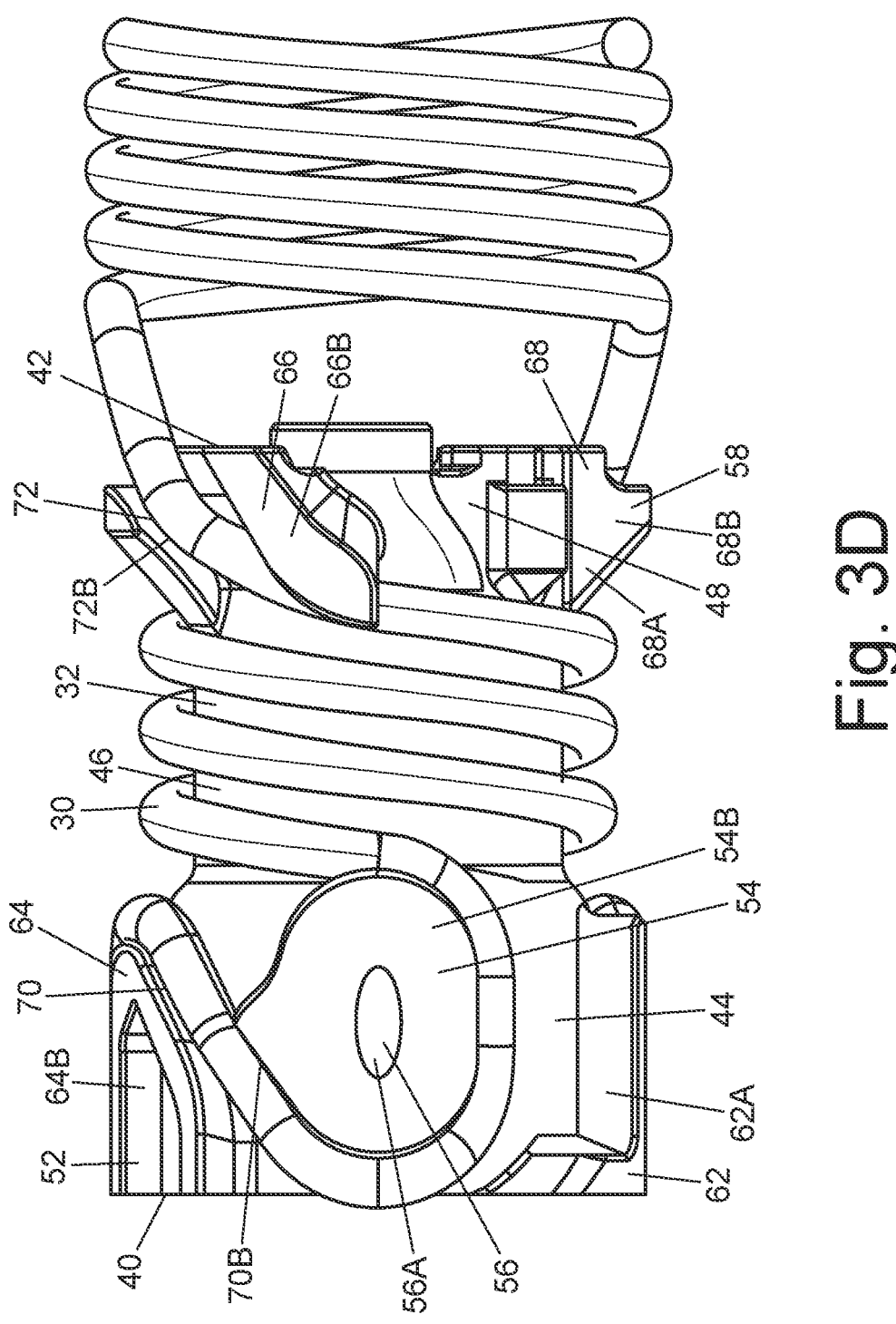
FIG. 3D is a second side view of the bulkhead showing the wire heater wrapped around the bulkhead.

FIG. 3A is a top view of bulkhead 32 showing wire heater 30 wrapped around bulkhead 32. FIG. 3B is a bottom view of bulkhead 32 showing wire heater 30 wrapped around bulkhead 32. FIG. 3C is a first side view of bulkhead 32 showing wire heater 30 wrapped around bulkhead 32. FIG. 3D is a second side view of bulkhead 32 showing wire heater 30 wrapped around bulkhead 32. FIGS. 3A-3D will be discussed together. FIGS. 3A-3D show wire heater 30 and bulkhead 32. Bulkhead 32 includes upstream end 40, downstream end 42, upstream portion 44, middle portion 46, downstream portion 48, first plurality of walls 52, pads 54 (including pad 54A (shown in FIGS. 3A-3C) and pad 54B (shown in FIGS. 3A-3B and 3D)), AOA openings 56 (including AOA opening 56A (shown in FIG. 3C) and AOA opening 56B (shown in FIG. 3D)), and second plurality of walls 58. First plurality of walls 52 include L-shaped walls 62 (including L-shaped wall 62A (shown in FIGS. 3A and 3D) and L-shaped wall 62B (shown in FIGS. 3B-3C)) and U-shaped walls 64 (including U-shaped wall 64A (shown in FIGS. 3A and 3C) and U-shaped wall 64B (shown in FIGS. 3B and 3D)). Second plurality of walls 58 include curved walls 66 (including curved wall 66A (shown in FIGS. 3A-3C) and curved wall 66B (shown in FIGS. 3A-3B and 3D)) and ramped walls 68 (including ramped wall 68A (shown in FIGS. 3A and 3C-3D) and ramped wall 68B (shown in FIGS. 3B and 3C-3D)). Bulkhead 32 further includes upstream channels 70 (including upstream channel 70A (shown in FIGS. 3A and 3C) and upstream channel 70B (shown in FIGS. 3B and 3D)) and downstream channels 72 (including downstream channel 72A (shown in FIGS. 3A and 3C) and downstream channel 72B (shown in FIGS. 3B and 3D)).

First wire heater 30 and bulkhead 32 are described above in reference to FIGS. 2A-2B. Wire heater 30 extends through probe head 12 from an upstream end to a downstream end of probe head 12 to provide heating to probe head 12. Bulkhead 32 is positioned in probe head 12 downstream from tip 18 of probe head 12 and adjacent AOA ports 22 (shown in FIG. 1).

Bulkhead 32 includes upstream end 40 and downstream end 42 opposite of upstream end 40. Bulkhead 32 includes upstream portion 44, middle portion 46, and downstream portion 48. Upstream portion 44 is positioned near tip 18 of probe head 12. Upstream portion 44 extends axially away from upstream end 40 of bulkhead 32. Middle portion 46 is connected to upstream portion 44 and extends axially away from upstream portion 44. Downstream portion 48 is connected to middle portion 46 and extends axially away from middle portion 46.

Bulkhead 32 further includes first plurality of walls 52 extending radially outward from an exterior surface of upstream portion 44 of bulkhead 32. Pads 54 extend radially outward from the exterior surface of upstream portion 44 of bulkhead 32. Pads 54 are positioned on opposite sides of bulkhead 32. First plurality of walls 52 are positioned between and adjacent to pads 54. AOA openings 56 extend through pads 54. AOA openings 56 are aligned with AOA ports 22 (shown in FIG. 1). Bulkhead 32 further includes second plurality of walls 58 extending radially outward from an exterior surface of downstream portion 48 of bulkhead 32.

Pads 54 include pad 54A and pad 54B. Pad 54A is positioned on a first side of bulkhead 32, and pad 54B is positioned on a second side of bulkhead 32. Pads 54 are raised portions that extend radially away from an exterior surface of upstream portion 44 of bulkhead 32. Pads 54 are generally oval shaped and each include a pointed portion on one side of pads 54. Pad 54A includes a pointed portion directed towards a top side of bulkhead 32, and pad 54B includes a pointed portion directed towards a bottom side of bulkhead 32. AOA openings 56 extend through pads 54. Specifically, AOA opening 56A extends through pad 54A, and AOA opening 56B extends through pad 54B. AOA openings 56 extend through pads 54 and are fluidly coupled to pressure paths (not shown in FIGS. 3A-3D) extending through bulkhead 32.

First plurality of walls 52 include L-shaped walls 62 and U-shaped walls 64 extending radially outward from an exterior surface of upstream portion 44 of bulkhead 32.

L-shaped walls 62 include L-shaped wall 62A and L-shaped wall 62B. L-shaped wall 62A is positioned on a top side of bulkhead 32 adjacent to pad 54B, and L-shaped wall 62B is positioned on a bottom side of bulkhead 32 adjacent to pad 54A. L-shaped walls 62 are raised portions that extend radially away from an exterior surface of upstream portion 44 of bulkhead 32. L-shaped walls 62 are generally L-shaped and each include a first straight portion and a second straight portion. The first straight portion of L-shaped wall 62A extends from upstream end towards downstream end of bulkhead 32. The second straight portion of L-shaped wall 62A extends circumferentially around upstream portion 44 from the first straight portion towards a second side of bulkhead 32. The first straight portion of L-shaped wall 62B extends from upstream end towards downstream end of bulkhead 32. The second straight portion of L-shaped wall 62B extends circumferentially around upstream portion 44 from the first straight portion towards a first side of bulkhead 32.

U-shaped walls 64 include U-shaped wall 64A and U-shaped wall 64B. U-shaped wall 64A is positioned on a top side of bulkhead 32 between L-shaped wall 62A and pad 54A, and U-shaped wall 64B is positioned on a bottom side of bulkhead 32 between L-shaped wall 62B and pad 54B. U-shaped walls 64 are raised portions that extend radially away from an exterior surface of upstream portion 44 of bulkhead 32. U-shaped walls 64 are generally U-shaped and each include a first straight portion, a curved portion, and a second straight portion. The first straight portions are longer than the second straight portions. The first straight portion of U-shaped wall 64A extends from upstream end 40 of bulkhead 32 to the curved portion. The curved portion of U-shaped wall 64A curves from the first straight portion to the second straight portion, generally extending from the top side towards the first side of bulkhead 32. The second straight portion of U-shaped wall 64A extends from the curved portion to upstream end 40 of bulkhead 32. The first straight portion of U-shaped wall 64B extends from upstream end 40 of bulkhead 32 to the curved portion. The curved portion of U-shaped wall 64B curves from the first straight portion to the second straight portion, generally extending from the bottom side towards the second side of bulkhead 32. The second straight portion of U-shaped wall 64B extends from the curved portion to upstream end 40 of bulkhead 32.

Second plurality of walls 58 include curved walls 66 and ramped walls 68 extending radially outward from an exterior surface of downstream portion 48 of bulkhead 32.

Curved walls 66 include curved wall 66A and curved wall 66B. Curved wall 66A is positioned on a first side of bulkhead 32, and curved wall 66B is positioned on a second side of bulkhead 32. Curved walls 66 are raised portions that extend radially away from an exterior surface of downstream portion 48 of bulkhead 32. Curved wall 66A curves from an upstream end to a downstream end of downstream portion 48 of bulkhead 32. Curved wall 66B curves from an upstream end to a downstream end of downstream portion 48 of bulkhead 32.

Ramped walls 68 include ramped wall 68A and ramped wall 68B. Ramped wall 68A is positioned on a top side of bulkhead 32 adjacent to curved wall 66A, and ramped wall 68B is positioned on a bottom side of bulkhead 32 adjacent to curved wall 68A. Ramped walls 68 are raised portions that extend radially away from an exterior surface of downstream portion 48 of bulkhead 32. Ramped walls 68 are generally curved in shape and ramp from a first height to a second height that is greater than the first height. Ramped wall 68A curves from an upstream end to a downstream end of downstream portion 48 of bulkhead 32 and ramps from the first height at the upstream end to the second height at the downstream end of downstream portion 48 of bulkhead 32. Ramped wall 68B curves from the upstream end to the downstream end of downstream portion 48 of bulkhead 32 and ramps from the first height at the upstream end to the second height at the downstream end of downstream portion 48 of bulkhead 32.

First plurality of walls 52 on upstream portion 44 of bulkhead 32 creates upstream channels 70 on upstream portion 44 of bulkhead 32. Upstream channels 70 include upstream channel 70A that receives a first length of wire heater 30 and upstream channel 70B that receives a second length of wire heater 30. Upstream channel 70A extends from the top side to the first side of bulkhead 32, and upstream channel 70B extends from the bottom side to the second side of bulkhead 32. Upstream channel 70A has a first portion that extends between L-shaped wall 62A and U-shaped wall 64A, a second portion that extends between U-shaped wall 64A and pad 54A, and a third portion that wraps around pad 54A. Upstream channel 70B has a first portion that extends between L-shaped wall 62B and U-shaped wall 64B, a second portion that extends between U-shaped wall 64B and pad 54B, and a third portion that wraps around pad 54B.

Second plurality of walls 58 on downstream portion 48 of bulkhead 32 creates downstream channels 72 on downstream portion 48 of bulkhead 32. Downstream channels 72 include downstream channel 72A that receives a first length of wire heater 30 and downstream channel 72B that receives a second length of wire heater 30. Downstream channel 72A extends from the first side to the top side of bulkhead 32, and downstream channel 72B extends from the second side to the bottom side of bulkhead 32. Downstream channel 72A has a first portion that extends between ramped wall 68A and curved wall 66A. Downstream channel 72B has a first portion that extends between ramped wall 68B and curved wall 66B.

First plurality of walls 52 and pads 54 on upstream portion 44 of bulkhead 32 form upstream channels 70 that wire heater 30 can be wrapped through. This allows wire heater 30 to be positioned adjacent to AOA ports 22 (shown in FIG. 1), as wire heater 30 can be wrapped around pads 54 that include AOA openings 56 that receive the air intake from AOA ports 22. When heater wire 30 is wrapped around pads 54, heater wire 30 partially surrounds AOA openings 56, localizing heat adjacent AOA ports 22. It further increases the amount of heating being provided to upstream portion 44 of bulkhead 32, as a greater length of wire heater 30 is in contact with bulkhead 32 due to wire heater 30 being wrapped through upstream channels 70 between first plurality of walls 52 and pads 54. Increasing heating to middle portion 46 of bulkhead 32 localizes heat directly downstream from AOA ports 22.

Wire heater 30 is wrapped in a spiral pattern around middle portion 46 of bulkhead 32. This increases the amount of heating being provided to middle portion 46 of bulkhead 32, as a greater length of wire heater 30 is in contact with bulkhead 32.

Second plurality of walls 58 on downstream portion 48 of bulkhead 32 formed downstream channels 72 that wire heater 30 can be wrapped through. This increases the amount of heating being provided to downstream portion 48 of bulkhead 32, as a greater length of wire heater 30 is in contact with bulkhead 32 due to wire heater 30 being wrapped through downstream channels 72 between second plurality of walls 58. Increasing heating to downstream portion 48 of bulkhead localizes heat downstream from AOA ports 22.

Increasing heating to bulkhead 32 localizes heat around and downstream from AOA ports 22 to provide targeted and increased heat adjacent AOA ports 22. As a result, more moisture will be prevented from entering AOA ports 22. Further, any moisture that does enter AOA ports 22 will be evaporated off at bulkhead 32, directly downstream from AOA ports 22. Therefore, moisture is prevented from traveling through probe head 12. As such, the geometry of bulkhead 32 allows for more efficient and effective heating adjacent AOA ports 22 to ensure that air data probe 10 can accurately generate AOA readings during flight in liquid water, ice crystal, and mixed phase icing conditions.

Figure 4A:
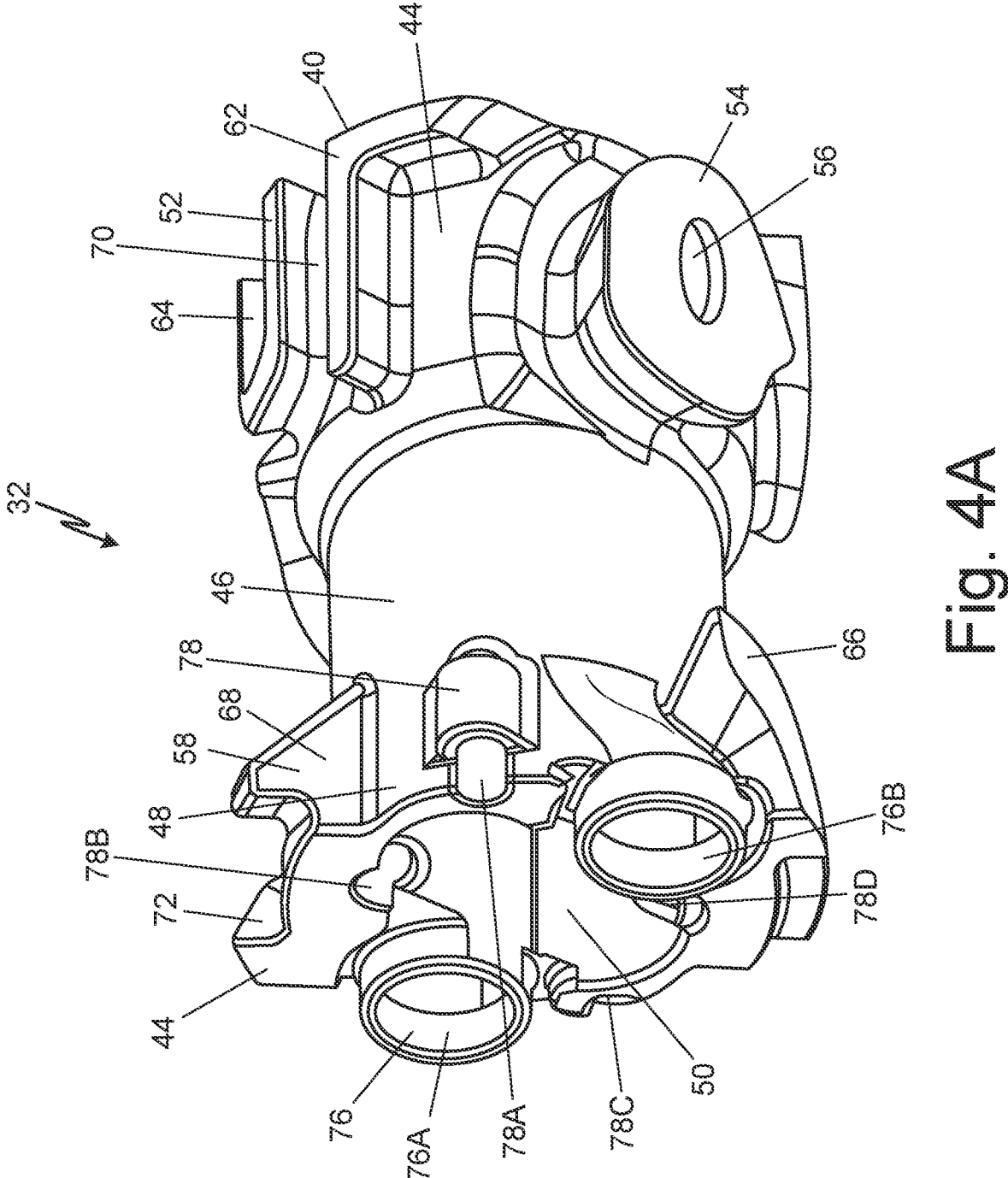
FIG. 4A is an isometric view of the bulkhead.
Figure 4B:
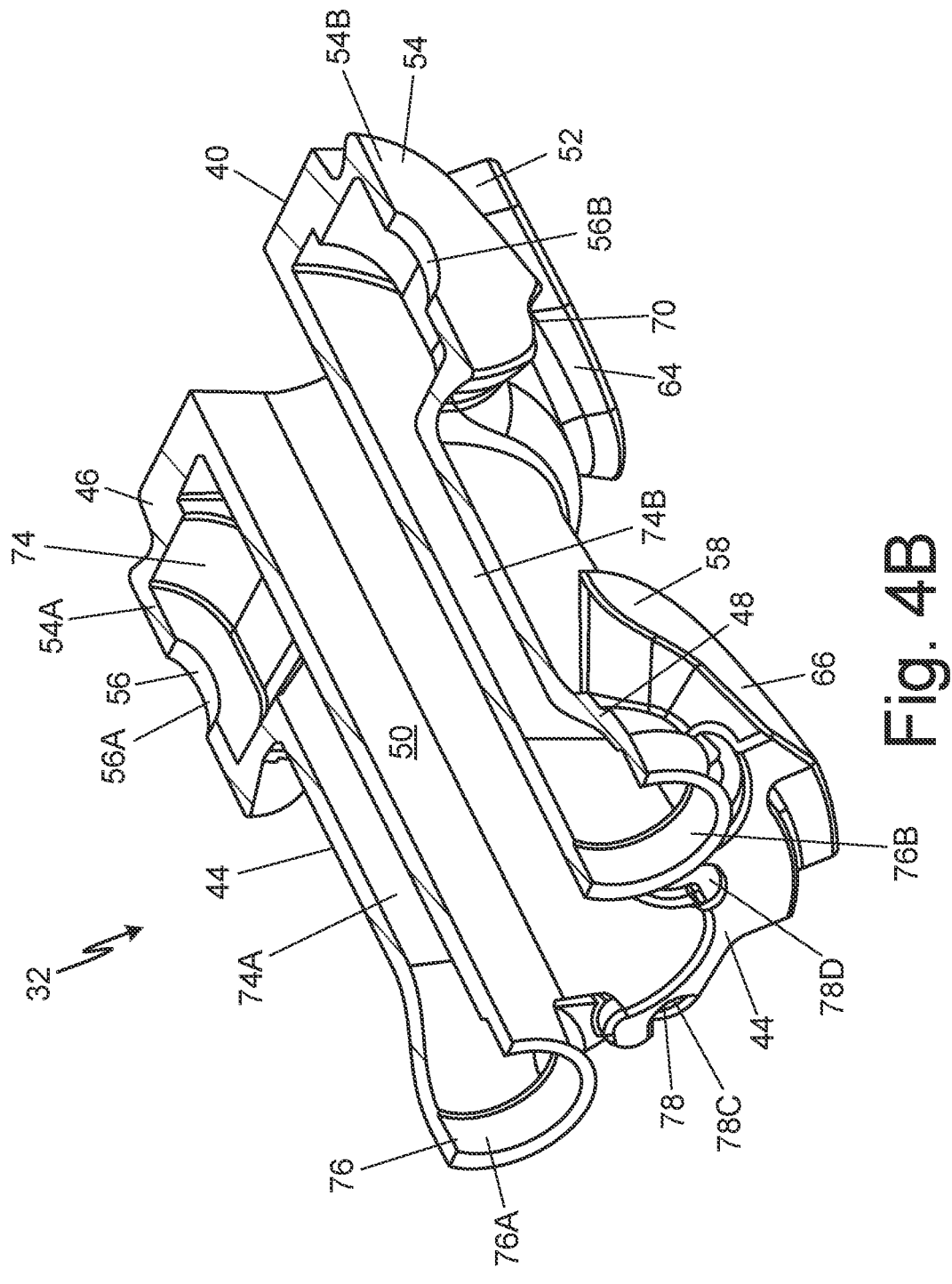
FIG. 4B is a cross-sectional view of the bulkhead.

FIG. 4A is an isometric view of bulkhead 32. FIG. 4B is a cross-sectional view of bulkhead 32. FIGS. 4A-4B will be discussed together. Bulkhead 32 includes upstream end 40, downstream end 42, upstream portion 44, middle portion 46, downstream portion 48, passthrough 50, first plurality of walls 52, pads 54 (including pad 54A and pad 54B), AOA openings 56 (including AOA opening 56A and AOA opening 56B), and second plurality of walls 58. First plurality of walls 52 include L-shaped walls 62 (shown in FIG. 4A) and U-shaped walls 64. Second plurality of walls 58 include curved walls 66 and ramped walls 68 (shown in FIG. 4A). Bulkhead 32 further includes upstream channels 70 and downstream channels 72 (shown in FIG. 4A). Bulkhead 32 also includes pressure paths 74 (shown in FIG. 4B) (including pressure path 74A and pressure path 74B), connectors 76 (including connector 76A and connector 76B), and thermocouple wells 78 (including thermocouple well 78A (shown in FIG. 4A), thermocouple well 78B (shown in FIG. 4B), thermocouple well 78C, and thermocouple well 78D).

Bulkhead 32 has the same shape and design as described above with respect to FIGS. 3A-3D. FIG. 4B shows passthrough 50 extending from upstream end 40 to downstream end 42 of bulkhead 32.

As shown in FIGS. 4A-4B, bulkhead 32 includes pressure paths 74 extending through bulkhead 32. Pressure paths 74 are cavities that extend along opposite sides of bulkhead 32. Pressure path 74A extends along a first side of bulkhead 32, and pressure path 74B extends along a second side of bulkhead 32. Pressure paths 74 extend from pads 54 through upstream portion 44, middle portion 46, and downstream portion 48 of bulkhead 32. Pressure paths 74 are fluidly coupled to AOA openings 56. Pressure path 74A is fluidly coupled to AOA opening 56A, and pressure path 74B is fluidly coupled to AOA opening 56B.

Connectors 76 are formed on downstream end 42 of bulkhead 32. Connector 76A is on a first side of bulkhead 32, and connector 76B is on a second side of bulkhead 32. Connectors 76 are configured to connect tubes extending through probe head 12 (shown in FIG. 2A). Connectors 76 are fluidly coupled to pressure paths 74. Connector 76A is fluidly coupled to pressure path 74A, and connector 76B is fluidly coupled to pressure path 74B.

Air that flows through AOA ports 22 (shown in FIGS. 1-2B) flows into bulkhead 32 through AOA openings 56. The air flows from AOA openings 56 into pressure paths 74 in bulkhead 32. The air flows along pressure paths 74 and exits bulkhead 32 at connectors 76.

Bulkhead 32 further includes thermocouple wells 78 in downstream portion 48 of bulkhead 32. Thermocouple wells 78 are formed in downstream end 42 of bulkhead 32. Thermocouple wells 78 are pockets formed in a downstream end of downstream portion 48. Thermocouple wells 78 are open on the downstream end of downstream portion 48 of bulkhead 32 and the pocket extends in an upstream direction from the downstream end of downstream portion 48. Thermocouple well 78A is positioned adjacent a top side of bulkhead 32, thermocouple well 78B is positioned adjacent a first side of bulkhead 32, thermocouple well 78C is positioned adjacent a bottom side of bulkhead 32, and thermocouple well 78D is positioned adjacent a second side of bulkhead 32. The embodiment of bulkhead 32 shown in FIGS. 4A-4B includes four thermocouple wells 78, however bulkhead 32 can include any number of thermocouple wells or no thermocouple wells in alternate embodiments.

Thermocouple wells 78 are each shaped to receive a thermocouple. Positioning thermocouples in thermocouple wells 78 allows for the thermocouples to sense a temperature at bulkhead 32, providing a more accurate temperature reading of bulkhead 32. Knowing the temperature of bulkhead 32 allows for improved fault detection of components near or adjacent bulkhead 32, as temperature readings outside of a predetermined range could indicate failure of or damage to a component of air data probe 10 (shown in FIG. 1).

Figure 5:
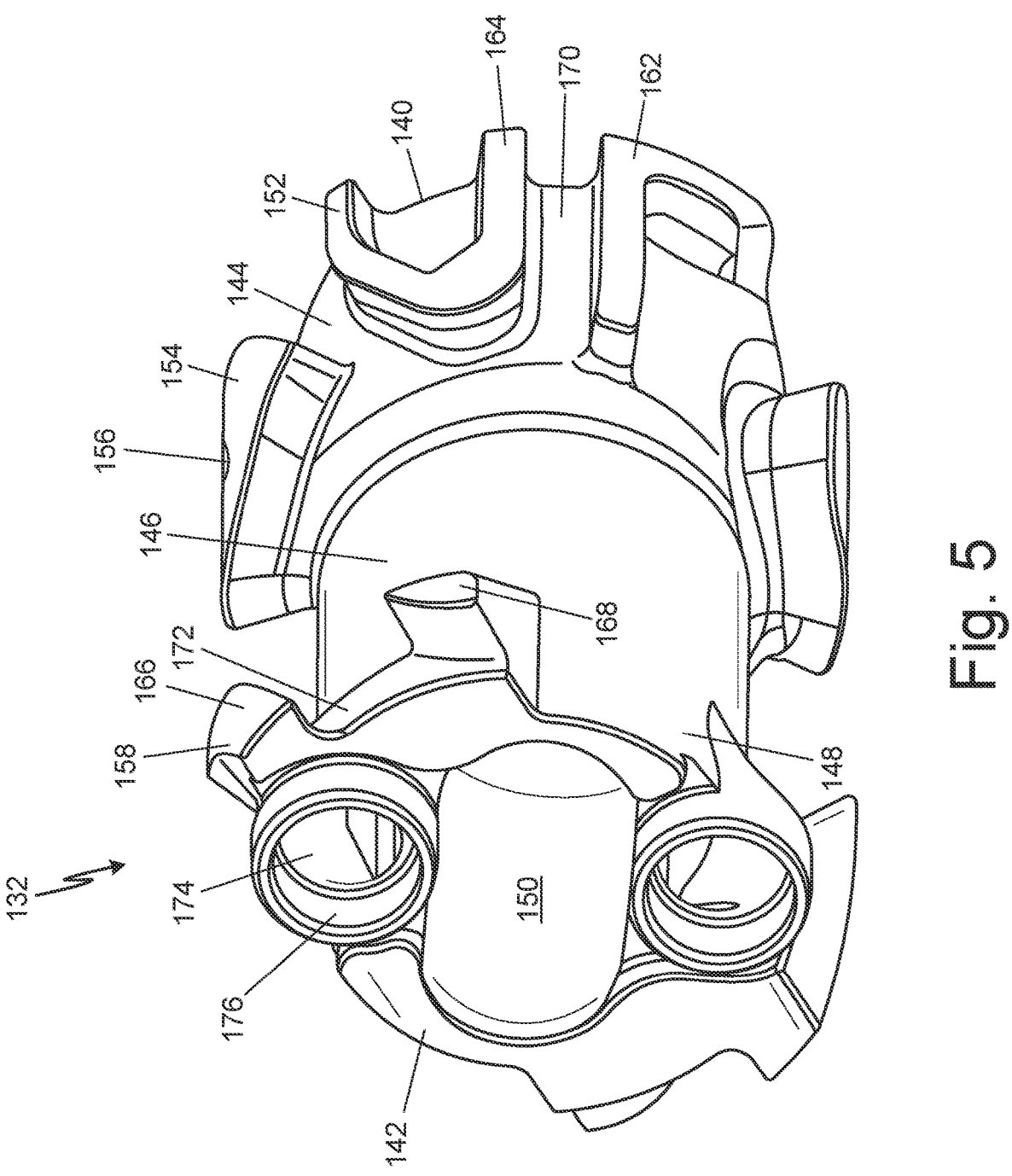
FIG. 5 is an isometric view of a second embodiment of the bulkhead.

FIG. 5 is an isometric view of bulkhead 132. Bulkhead 132 includes upstream end 140, downstream end 142, upstream portion 144, middle portion 146, downstream portion 148, passthrough 150, first plurality of walls 152, pads 154, AOA openings 156, and second plurality of walls 158. First plurality of walls 152 include L-shaped walls 162 and U-shaped walls 164. Second plurality of walls 158 include curved walls 166 and ramped walls 168. Bulkhead 132 further includes upstream channels 170 and downstream channels 172. Bulkhead 132 also includes pressure paths 174, and connectors 176.

Bulkhead 132 shown in FIG. 5 has generally the same structure and design as bulkhead 32 shown in FIGS. 2A-4B, however bulkhead 132 does not include thermocouple wells on downstream end 142 of bulkhead 132. Bulkhead 132 allows for increased heating near AOA ports 22 (shown in FIG. 1) similar to bulkhead 32. Bulkhead 132 also allows air gap 60 (shown in FIGS. 2A-2B) to be formed between middle portion 146 of bulkhead 132 and probe head 12 (shown in FIGS. 2A-2B). Because bulkhead 132 does not include thermocouple wells, bulkhead 132 is easier to manufacture and more cost-effective.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bulkhead for an air data probe, the bulkhead comprising:
an upstream end positioned near a probe head of the air data probe, wherein the probe head is configured to be positioned to receive ambient air;
a downstream end positioned axially downstream of the upstream end; and
an upstream portion extending axially away from the upstream end of the bulkhead, wherein the upstream portion further comprises:
an exterior surface;
a first plurality of walls extending radially outward from the exterior surface of the upstream portion;
a first pad extending radially outward from the exterior surface of the upstream portion; and
a first plurality of channels formed between one or more of the first plurality of walls and the first pad, wherein the first plurality of channels are configured to receive a wire heater.

2. The bulkhead of claim 1, wherein upstream portion further comprises:
a second pad extending radially outward from the exterior surface of the upstream portion;
wherein the first pad is positioned on a first side of the upstream portion; and
wherein the second pad is positioned on a second side of the upstream portion that is opposite the first side.

3. The bulkhead of claim 2, wherein the first plurality of walls includes:
a first wall positioned adjacent to the second pad;
a second wall positioned adjacent to the first pad;
a third wall positioned between the first wall and the first pad; and
a fourth wall positioned between the second wall and the second pad.

4. The bulkhead of claim 3, wherein:
the first wall is an L-shaped wall;
the second wall is an L-shaped wall;
the third wall is a U-shaped wall; and
the fourth wall is a U-shaped wall.

5. The bulkhead of claim 3, wherein the first plurality of channels further comprises:
a first channel formed between the first wall, the third wall, and the first pad, wherein the first channel is configured to receive a first length of the wire heater; and
a second channel formed between the second wall, the fourth wall, and the second pad, wherein the second channel is configured to receive a second length of the wire heater.

6. The bulkhead of claim 1, and further comprising:
a middle portion extending from the upstream portion;
a downstream portion extending from the middle portion to the downstream end; and
a passthrough extending from the upstream end to the downstream end through the upstream portion, the middle portion, and the downstream portion.

7. The bulkhead of claim 6, wherein an outer diameter of the middle portion is smaller than an outer diameter of the upstream portion.

8. The bulkhead of claim 6, wherein the downstream portion further comprises:

an exterior surface;

a second plurality of walls extending radially outward from the exterior surface of the downstream portion; and a second plurality of channels formed between the second plurality of walls, wherein the second plurality of channels are configured to receive a wire heater.

9. The bulkhead of claim 8, wherein the second plurality of walls further comprises:

a fifth wall positioned on a first side of the downstream portion;

a sixth wall positioned on a second side of the downstream portion that is opposite the first side;

a seventh wall positioned adjacent to the fifth wall; and an eighth wall positioned adjacent to the sixth wall.

10. The bulkhead of claim 9, wherein:

the fifth wall is a curved wall;

the sixth wall is a curved wall;

the seventh wall is a ramped wall; and the eighth wall is a ramped wall.

11. The bulkhead of claim 9, wherein the second plurality of channels further comprises:

a third channel formed between the fifth wall and the seventh wall, wherein the third channel is configured to receive a third length of the wire heater; and a fourth channel formed between the sixth wall and the eighth wall, wherein the fourth channel is configured to receive a fourth length of the wire heater.

12. The bulkhead of claim 6, wherein the upstream portion further comprises:

a second pad extending radially outward from the exterior surface of the upstream portion, wherein the first pad is positioned on a first side of the upstream portion, and wherein the second pad is positioned on a second side of the upstream portion that is opposite the first side;

a first opening extending through the first pad; and a second opening extending through the second pad.

13. The bulkhead of claim 12, and further comprising:

a first pressure path fluidly coupled to the first opening in the first pad and extending through the upstream portion, the middle portion, and the downstream portion; and a second pressure path fluidly coupled to the second opening in the second pad and extending through the upstream portion, the middle portion, and the downstream portion.

14. The bulkhead of claim 6, wherein the downstream portion further comprises:

a plurality of thermocouple wells positioned in a downstream end of the downstream portion, wherein each of the plurality of thermocouple wells is configured to receive a thermocouple.

* * * * *